United States Patent [19]

Golovin

[11] Patent Number: 5,508,130
[45] Date of Patent: Apr. 16, 1996

[54] SOLID ELECTROLYTES CONTAINING LIN(SO$_2$CF$_3$)$_2$ AND A TRIGLYME-CARBONATE SOLVENT, AND ELECTROCHEMICAL CELLS PRODUCED THEREFROM

[76] Inventor: Milton N. Golovin, 8 Wensley Dale Ct., Owings Mills, Md. 21117

[21] Appl. No.: 230,095

[22] Filed: Apr. 20, 1994

Related U.S. Application Data

[63] Continuation-in-part of Ser. No. 918,509, Jul. 22, 1992.

[51] Int. Cl.$^6$ ................................................. H01M 6/18
[52] U.S. Cl. ................................. 429/192; 429/197
[58] Field of Search ................................... 429/192, 197

[56] References Cited

U.S. PATENT DOCUMENTS

| | | |
|---|---|---|
| 4,505,997 | 3/1985 | Armand et al. . |
| 4,851,307 | 7/1989 | Armand et al. . |
| 5,021,308 | 6/1991 | Armand et al. . |
| 5,063,124 | 11/1991 | Gauthier et al. . |
| 5,072,040 | 12/1991 | Armand . |
| 5,162,177 | 11/1992 | Armand et al. . |
| 5,223,353 | 6/1993 | Ohsawa et al. ............... 429/192 |

OTHER PUBLICATIONS

Fiona M. Gray, "Solid Polymer Electrolytes", VCH Publishers, Inc., New York, NY (1991) (no month) pp. 7, 107 and 117.

L. A. Dominey et al., "The Stabilization of Electrolytes for Rechargeable Lithum Batteries", Proc. Electrochem. Soc., vol. 90 (1990) (no month) p. 56.

A. Webber, "Conductivity and Viscosity of Solution of LiCF$_3$SO$_3$, Li(CF$_3$SO$_2$)2N, and Their Mixtures", J. Electrochem. Soc., vol. 138 (Sep. 1991) p. 2586.

J. T. Dudley et al., "Conductivity of Electrolytes for Rechargeable Lithium Batteries", J. Power Sources, vol. 35 (1991) (no month) p. 59.

L. A. Dominey et al., "New Anions for Use in Polymer Electrolyte Rechargeable Lithium Batteries", Proc. Intersoc. Energy Convers. Eng. Conf., 25 (Mar. 1990) p. 3.

*Primary Examiner*—John S. Maples

[57] ABSTRACT

This invention is directed to solid electrolytes containing lithium bis(trifluoromethane sulfonyl)imide and a solvent and, in particular, a solvent comprising a mixture of an organic carbonate and triglyme as well as electrolytic cells prepared from such solid electrolytes.

23 Claims, 2 Drawing Sheets

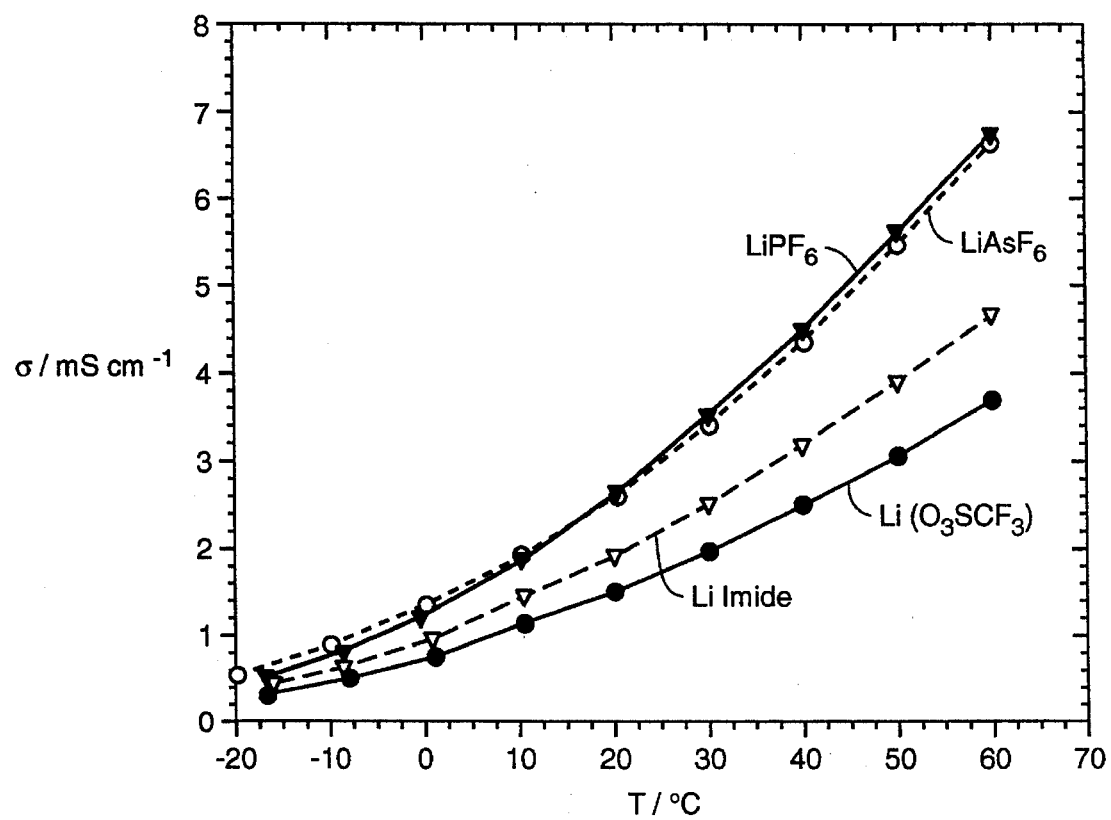
FIG._1

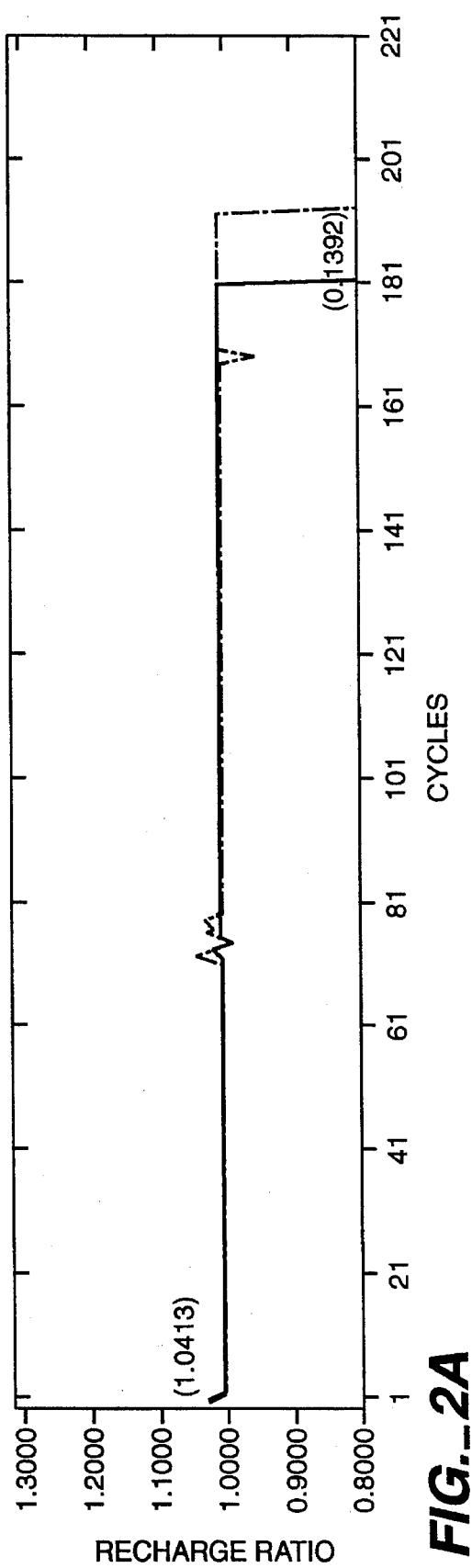
FIG._2A
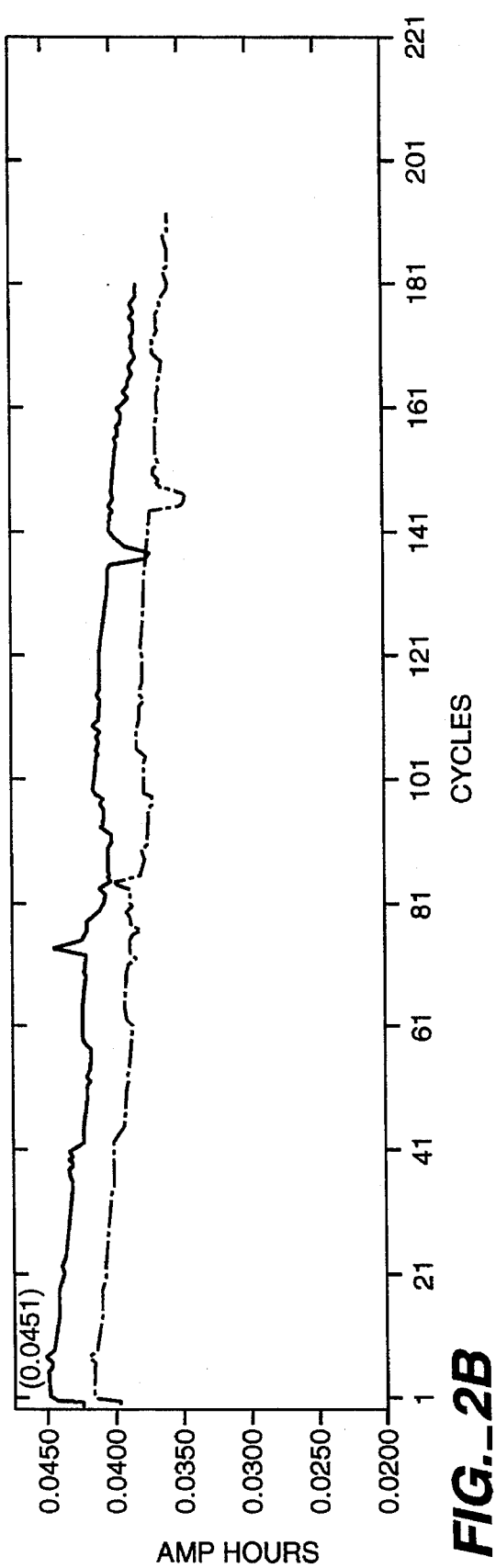
FIG._2B

SOLID ELECTROLYTES CONTAINING LIN(SO$_2$CF$_3$)$_2$ AND A TRIGLYME-CARBONATE SOLVENT, AND ELECTROCHEMICAL CELLS PRODUCED THEREFROM

This application is a continuation-in-part of U.S. patent application Ser. No. 07/918,509, filed Jul. 22, 1992.

BACKGROUND OF THE INVENTION

1. Field of the Invention

This invention is directed to solid electrolytes containing lithium bis(trifluoromethane sulfonyl)imide, a solvent and, in particular, a solvent comprising a mixture of triglyme and an organic carbonate. This invention is further directed to solid electrolytic cells (batteries) containing an anode, a cathode and a solid electrolyte containing lithium bis(trifluoromethane sulfonyl)imide, a solvent comprising a mixture of triglyme and an organic carbonate. This invention is also directed to methods for enhancing the cumulative capacity of the solid electrolytic cells by employing a solid electrolyte which contains lithium bis(trifluoromethane sulfonyl)imide, a solvent comprising a mixture of a organic carbonate and triglyme.

2. State of the Art

Electrolytic cells containing an anode, a cathode and a solid, solvent-containing electrolyte are known in the art and are usually referred to as "solid batteries". These cells offer a number of advantages over electrolytic cells containing a liquid electrolyte (i.e., "liquid batteries") including improved safety features. Notwithstanding their advantages, the use of these solid batteries over repeated charge/discharge cycles is substantially impaired because these batteries typically exhibit significant drops in their charge and discharge capacity over repeated cycles as compared to their initial charge and discharge capacity.

Specifically, solid batteries employ a solid electrolyte interposed between a cathode and an anode. The solid electrolyte contains either an inorganic or an organic matrix as well as a suitable inorganic ion salt. The inorganic matrix may be non-polymeric [e.g, β-alumina, silver oxide, lithium iodide, etc.] or polymeric [e.g., inorganic (polyphosphazine) polymers] whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic monomers include, by way of example, polyethylene oxide, polypropylene oxide, polyethyleneimine, polyepichlorohydrin, polyethylene succinate, and an acryloyl-derivatized polyalkylene oxide containing an acryloyl group of the formula CH$_2$=CR'C(O)O— where R' is hydrogen or lower alkyl of from 1–6 carbon atoms.

Because of their expense and difficulty in forming into a variety of shapes, inorganic non-polymeric matrices are generally not preferred and the art typically employs a solid electrolyte containing a polymeric matrix. Nevertheless, electrolytic cells containing a solid electrolyte containing a polymeric matrix suffer from low ion conductivity and, accordingly, in order to maximize the conductivity of these materials, the matrix is generally constructed into a very thin film, i.e., on the order of about 25 to about 250 μm. As is apparent, the reduced thickness of the film reduces the total amount of internal resistance within the electrolyte thereby minimizing losses in conductivity due to internal resistance.

The solid electrolytes also contain an inorganic ion salt and a solvent (plasticizer) which is typically added to the matrix in order to enhance the solubility of the inorganic ion salt in the solid electrolyte and thereby increase the conductivity of the electrolytic cell. In this regard, the solvent requirements of the solvent used in the solid electrolyte are art recognized to be different from the solvent requirements in liquid electrolytes. For example, solid electrolytes require a lower solvent volatility as compared to the solvent volatilities permitted in liquid electrolytes.

Suitable solvents well known in the art for use in such solid electrolytes include, by way of example, propylene carbonate, ethylene carbonate, γ-butyrolactone, tetrahydrofuran, glyme (dimethoxyethane), diglyme, tetraglyme, dimethylsulfoxide, dioxolane, sulfolane and the like.

A. Webber, J. Electrochem. Soc., 138 (1991) 2586, reports the use of lithium bis(trifluoromethane sulfonyl)imide in the liquid electrolyte systems propylene carbonate/1,2-dimethoxymethane, and propylene carbonate/1,2-dimethoxymethane/1,3-dioxolane. J. T. Dudley et al., J. Power Sources, 35 (1991) 59, investigated the conductivities of several salts including lithium bis(trifluoromethane sulfonyl)imide in various solvents. L. A. Dominey et al., Proc. Intersoc. Energy Convers. Eng. Conf. 25 (1990) 382, report a liquid electrolyte containing lithium bis(trifluoromethane sulfonyl)imide in tetrahydrofuran, or the polymer poly(methoxyethoxy methoxyethoxy-ethoxyphosphazene). U.S. Pat. No. 5,021,308 discloses cells using liquid electrolytes composed of lithium bis(trifluoromethane sulfonyl)imide in an aprotic liquid solvent mixture of propylene carbonate and ethylene carbonate or dimethoxy methane. U.S. Pat. Nos. 4,851,307 and 5,063,124 disclose the use of lithium bis(trifluoromethane sulfonyl)imide as a salt in a sulfonated solvent, which combination finds use as an ionically conductive material in an electrochemical cell. The ionically conductive material may contain a macromolecular material. U.S. Pat. No. 5,162,177 discloses liquid electrolytes consisting of an aprotic solvent, for example propylene carbonate and ethylene carbonate, and a lithium bis(trifluoromethane sulfonyl)imide salt. A mixed solvent of propylene carbonate and dimethoxy methane was also used. U.S. Pat. No. 5,072,040 discloses several methods for the synthesis of lithium bis(trifluoromethane sulfonyl)imide. U.S. Pat. No. 4,505,997 discloses a method of making lithium bis(trifluoromethane sulfonyl)imide, in solid solutions with poly(propylene oxide) and poly(ethylene oxide) which have cationic conductivity enabling their use as electrolytes in rechargeable cells. Fiona M. Gray "Solid Polymer Electrolytes", VCH Publishers, Inc. New York, N.Y. (1991) pages 7, 107 and 117, discloses lithium bis(trifluoromethane sulfonyl)imide is a salt with possible applications in polymer electrolytes. Gray distinguishes polymer electrolytes per se from systems containing low-molecular weight solvents as well as polymers. Gray teaches that in the former case net ionic motion takes place without long-range displacement of the solvent, ion transport relies on local relaxation processes in the polymer chain which may provide liquid-like properties. Gray also reports that CH$_3$(OCH$_2$CH$_2$)$_n$OCH$_3$ has been added to poly(ethylene oxide)-based electrolytes to improve their conductivity, but the mechanical properties of the materials were poor. The disclosures of each of the foregoing references is incorporated herein in its entirety.

The solid, solvent-containing electrolyte is typically formed in one of two methods. In one method, the solid matrix is first formed and then a requisite amount of this material is dissolved in a volatile solvent. Requisite amounts of the inorganic ion salt and the electrolyte solvent (i.e., the triglyme of Formula I and the organic carbonate) are then added to the solution. This solution is then placed on the surface of a suitable substrate (e.g., the surface of a cathode) and the volatile solvent is removed to provide for the solid electrolyte.

In the other method, a monomer or partial polymer of the polymeric matrix to be formed is combined with appropriate amounts of the inorganic ion salt and the solvent. This mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte.

When the solid electrolyte is formed on a cathodic surface, an anodic material can then be laminated onto the solid electrolyte to form a solid battery (i.e., an electrolytic cell).

Notwithstanding the above, the initial capacity of solid batteries is often less than desirable. Moreover, even when the initial capacity of the solid battery is relatively high, such solid batteries often exhibit rapid decline in capacity over their cycle life.

Specifically, the cumulative capacity of a solid battery is the summation of the capacity of a solid battery over each cycle (charge and discharge) in a specified cycle life. Solid batteries having a high initial capacity but which rapidly lose capacity over the cycle life will have low cumulative capacity which interferes with the effectiveness of these batteries for repeated use.

In view of the above, the art is searching for methods to enhance the cumulative capacity of such solid batteries. It goes without saying that increases in the cumulative capacity of solid batteries would greatly facilitate their widespread commercial use.

Another particular problem in the development of solid polymer electrolytes is the poor ambient temperature (0°–60° C.) conductivity of the electrolyte.

Still another problem of solid polymer electrolytes is the presence of dangerous or thermally unstable inorganic ion salts. It would be advantageous if the solid electrolyte were highly conductive at ambient temperatures, safe and thermally stable, as well as, capable of enhancing high cumulative capacity in solid batteries.

SUMMARY OF THE INVENTION

The present invention is directed, in part, to the discovery that the use of specified mixtures of an organic carbonate and a triglyme of Formula I as the solvent in solid, single phase, solvent-containing electrolytes provides for enhanced cumulative capacity, good ionic conductivity and thermal stability, as well as, mechanical strength when these electrolytes are used in solid batteries. The specific mixtures of imide salt, lithium bis(trifluoromethane sulfonyl)imide organic carbonate and triglyme employed herein to achieve the desired increase in cumulative capacity are encompassed by ratios of organic carbonate to triglyme of from about 1:10 to about 10:1.

Surprisingly, the use of either the organic carbonate or triglyme by itself does not provide for the enhancements seen when using the specific mixtures recited above.

Accordingly, in one of its composition aspects, this invention is directed to a solid, single-phase, solvent-containing electrolyte which comprises:

a solid polymeric matrix;

lithium bis(trifluoromethane sulfonyl)imide; and a solvent comprising about a 10:1 to 1:10 mixture of an organic carbonate and a triglyme represented by Formula I:

$$RO(R_1O)_3R_2 \qquad \text{I}$$

where R and $R_2$ are independently selected from the group consisting of alkyl of from 1 to 6 carbon atoms, phenyl, alkphenyl of from 7 to 12 carbon atoms, and phenyl substituted with 1 to 3 substituents selected from the group consisting of alkyl of from 1 to 4 carbon atoms, alkoxy of from 1 to 4 carbon atoms, chloro and bromo; and $R_1$ is —$(CR_3R_4CR_5R_6)$— where $R_3$, $R_4$, $R_5$ and $R_6$ are independently selected from the group consisting of hydrogen and alkyl of from 1 to 4 carbon atoms.

In another of its composition aspects, the present invention is directed to an electrolytic cell which comprises:

an anode comprising a compatible anodic material;

a cathode comprising a compatible cathodic material; and interposed therebetween a solid, single-phase, solvent-containing electrolyte which comprises:

a solid polymeric matrix;

lithium bis(trifluoromethane sulfonyl)imide; and a solvent comprising about a 10:1 to 1:10 mixture of an organic carbonate and a triglyme represented by Formula I:

$$RO(R_1O)_3R_2 \qquad \text{I}$$

where R and $R_2$ are independently selected from the group consisting of alkyl of from 1 to 6 carbon atoms, phenyl, alkphenyl of from 7 to 12 carbon atoms, and phenyl substituted with from 1 to 3 substituents selected from the group consisting of alkyl of from 1 to 4 carbon atoms, alkoxy of from 1 to 4 carbon atoms, chloro and bromo; and $R_1$ is —$(CR_3R_4CR_5R_6)$— where $R_3$, $R_4$, $R_5$ and $R_6$ are independently selected from the group consisting of hydrogen and alkyl of from 1 to 4 carbon atoms.

Preferably, the solid polymeric matrix is an organic matrix derived from a solid matrix forming monomer or partial polymer thereof.

In one preferred embodiment, R and $R_2$ are methyl. In another preferred embodiment, $R_3$, $R_4$, $R_5$, and $R_6$ are each hydrogen or alkyl of from 1 to 2 carbon atoms. Most preferably, $R_1$ is ethylene —$(CH_2CH_2)$—.

In still another preferred embodiment, the ratio of organic carbonate to the triglyme of Formula I is from about 6:1 to about 1:6; more preferably, from about 4:1 to about 1:4; even more preferably from about 3:1 to about 1:3; yet even more preferably from about 2:1 to about 1:2; and still even more preferably about 1:1.

In yet another preferred embodiment, the organic carbonate is an aliphatic or an alicyclic carbonate. Preferably, the alicyclic carbonate is represented by a compound of the formula:

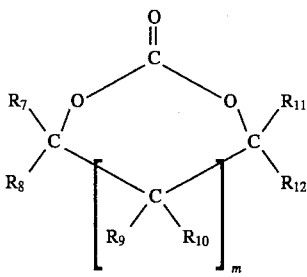

where each of $R_7$, $R_8$, $R_9$, $R_{10}$ $R_{11}$, and $R_{12}$ are independently selected from the group consisting of hydrogen and alkyl of from 1 to 2 carbon atoms, and and m is an integer equal to 0 or 1. More preferably, the alicyclic carbonate is selected from the group consisting of propylene carbonate and ethylene carbonate.

Preferably, the aliphatic carbonate is represented by a compound of the formula:

$$R_{13}[OC(O)]_n OR_{14}$$

where $R_{13}$ and $R_{14}$ are independently selected from the group consisting of alkyl of from 1 to 4 carbon atoms and n is an integer of from 1 to 2.

In one of its method aspects, the present invention is directed to a method for enhancing the cumulative capacity of an electrolytic cell which comprises employing the solid, single-phase, solvent-containing electrolyte described above in the electrolytic cell.

BRIEF DESCRIPTIONS OF THE DRAWINGS

FIG. 1 illustrates the conductivity in mScm$^{-1}$ of the electrolyte of the present invention over a wide temperature range.

FIG. 2 illustrates the high temperature capacity per amp hour (Ah) over many cycles for an electrolytic cell which comprises a lithium on nickel anode; a cathode comprising $V_6O_{13}$; and interposed therebetween a solid, solvent-containing electrolyte which comprises a cured product of a composition comprising urethane acrylate, a solvent mixture (4:1) of propylene carbonate and triglyme [$CH_3O(CH_2CH_2O)_3CH_3$], and lithium bis(trifluoromethane sulfonyl)imide.

In the figures, all batteries were tested at about 1 mA/cm$^2$ and between about 1.8 and 3.0 volts.

DETAILED DESCRIPTION OF THE PREFERRED EMBODIMENTS

As noted above, this invention is directed to solid, solvent-containing electrolytes which, by virtue of the salt and solvent employed, provide for enhanced capacity when used in a solid battery. However, prior to describing this invention is further detail, the following terms will first be defined.

Definitions

As used herein, the following terms have the following meanings.

The term "discharge capacity" or "capacity" of the cell refers to the total amount of charge the fully charged battery can discharge to a certain final cell voltage. It is measured in ampere-hours. It is a measure of the useful charge in the battery. The initial capacity is that measured during the first full cycle of the cell. A comparison of the average cycle capacity to that of the initial cycle provides a measure of how well the cell maintains a constant capacity over repeated cycles.

The "recharge ratio" refers to the ratio of discharge to charge in each cycle. Ideally, the recharge ratio should be unity in each cycle, indicating that all charge is discharged in the cycle.

The term "cycle" refers to the consecutive charge/discharge cycle. The ability of the cell or battery to maintain a useful capacity for many cycles indicates the useful life of the cell or battery.

The term "solid polymeric matrix" refers to an electrolyte compatible material formed by polymerizing an inorganic or organic monomer (or partial polymers thereof) and which, when used in combination with the other components of the electrolyte, renders the electrolyte solid. The solid matrix may or may not be ion-conducting. Preferably, however, the solid matrix is capable of ionically conducting inorganic cations (e.g., alkali ions ).

Suitable solid polymeric matrices are well known in the art and include solid matrices formed from inorganic polymers, organic polymers or a mixture of polymers with inorganic non-polymeric materials.

Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized, preferably in the presence of an inorganic ion salt and a solvent mixture of an organic carbonate and a triglyme compound of Formula I above, to form solid matrices which are suitable for use as solid electrolytes in electrolytic cells. Suitable solid matrix forming monomers are well known in the art and the particular monomer employed is not critical. Preferably, the solid matrix forming monomers have at least one hetero atom capable of forming donor acceptor bonds with inorganic cations (e.g., alkali ions). When polymerized, these compounds form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), vinyl sulfonate polyalkylene oxides (as disclosed in U.S. patent application Ser. No. 07/918,438 filed Jul. 22, 1992, entitled "SOLID ELECTROLYTES DERIVED BY POLYMERIZATION OF VINYL SULFONATE POLYALKYLENE OXIDES" now U.S. Pat. No. 5,262,253, which patent is incorporated herein by reference in its entirety), and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of an inorganic ion salt and a solvent mixture of an organic carbonate and a triglyme compound of Formula I above, to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, etc. The resulting cured product preferably contains repeating units containing at least one hetero atom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the inorganic ion salt and the organic carbonate/triglyme solvent. For example, a composition comprising requisite amounts of the solid matrix forming monomer, inorganic ion salt and organic carbonate/triglyme solvent can be applied to a substrate and then cured. Alternatively, the solid matrix forming monomer can be first cured and then dissolved into a suitable volatile solvent. Requisite amounts of the inorganic ion salt and organic carbonate/triglyme solvent can then be added. The mixture is then placed on a substrate and removal of the volatile solvent results in formation of a solid electrolyte. In either case, the resulting solid electrolyte is a homogeneous, single phase product which is maintained upon curing, and does not readily separate upon cooling to temperatures below room temperature. Accordingly, the solid electrolyte of this invention does not include a separator as is typical of liquid electrolytes.

The term "inorganic ion salt" refers to any inorganic salt which is suitable for use in a solid electrolyte. The particular inorganic ion salt employed in the present invention is lithium bis(trifluoromethane sulfonyl)imide, i.e. $LiN(SO_2CF_3)_2$. This salt is available from the 3M Company of St. Paul, Minn.

The term "organic carbonate" refers to hydrocarbyl carbonate compounds of no more than about 12 carbon atoms and which do not contain any hydroxyl groups. Preferably, the organic carbonate is an alicyclic or an aliphatic carbonate.

In a more preferred embodiment, the alicyclic carbonate is represented by the formula:

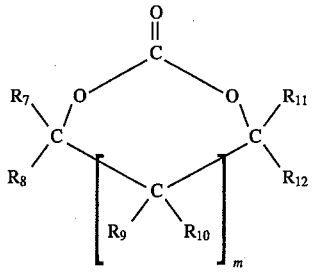

where each of $R_7$, $R_8$, $R_9$, $R_{10}$, $R_{11}$, and $R_{12}$ are independently selected from the group consisting of hydrogen and alkyl of from 1 to 2 carbon atoms, and m is an integer equal to 0 or 1.

In a particularly preferred embodiment, m is equal to zero and $R_7$, $R_8$, and $R_{11}$ are equal to hydrogen and $R_{12}$ is equal to hydrogen (ethylene carbonate), —$CH_3$ (propylene carbonate) or —$CH_2CH_3$ (butylene carbonate).

Suitable alicyclic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; spiro[1,3-oxa-2-cyclohexanone-5', 5'-1', 3'-oxa-2-cyclohexanone]; and 1,3-dioxolen-2-one (i.e.,

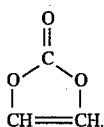

Several of these alicyclic carbonates are commercially available such as propylene carbonate and ethylene carbonate. Alternatively, the alicyclic carbonates can be readily prepared by well known reactions. For example, reaction of phosgene with a suitable alkane-α,β-diol (dihydroxy alkanes having hydroxyl substituents on adjacent carbon atoms) or an alkan-α,γ-diol (dihydroxy alkanes having hydroxyl substituents on carbon atoms in a 1,3 relationship) yields a alicyclic carbonate for use within the scope of this invention. See, for instance, U.S. Pat. No. 4,115,206, which is incorporated herein by reference in its entirety.

Likewise, the alicyclic carbonates useful for this invention may be prepared by transesterification of a suitable alkane-α,β-diol or an alkan-α,γ-diol with, e.g., diethyl carbonate under transesterification conditions. See, for instance, U.S. Pat. Nos. 4,384,115 and 4,423,205 which are incorporated herein by reference in their entirety.

Additional suitable alicyclic carbonates are disclosed in U.S. Pat. No. 4,747,850 which is also incorporated herein by reference in its entirety.

In a more preferred embodiment, the aliphatic carbonates are represented by the formulae:

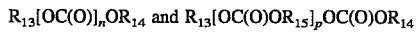

where each $R_{13}$ and $R_{14}$ are independently selected from the group consisting of alkyl of from 1 to 4 carbon atoms; $R_{15}$ is an alkylene group of from 2 to 4 carbon atoms; n is an integer of from 1 to 2, and p is an integer from 1 to 4.

Most preferably, the aliphatic carbonate is a carbonate of the formula:

$$R_{13}[OC(O)]_nOR_{14}$$

where $R_{13}$, $R_{14}$ and n are as defined above.

Aliphatic carbonates are well known in the art and a variety of which are commercially available. Additionally, the aliphatic carbonates can be prepared by transesterification of a suitable alcohol (e.g., $R_{13}OH$ and $R_{14}OH$) with, e.g., diethyl carbonate under transesterification conditions.

The term "electrolytic cell" refers to a composite containing an anode, a cathode and an ion-conducting electrolyte interposed therebetween.

The anode is typically comprised of a compatible anodic material which is any material which functions as an anode in a solid electrolytic cell. Such compatible anodic materials are well known in the art and include, by way of example, lithium, lithium alloys, such as alloys of lithium with aluminum, mercury, nickel, zinc, and the like, and intercalation based anodes such as carbon, $WO_3$, and the like.

The cathode is typically comprised of a compatible cathodic material (i.e., insertion compounds) which is any material which functions as a positive pole in a solid electrolytic cell. Such compatible cathodic materials are well known in the art and include, by way of example, manganese dioxide, molybdenum trioxide, vanadium pentaoxide, sulfides of titanium and niobium, chromium oxide, copper oxide, $V_6O_{13}$ and the like. The particular compatible cathodic material employed is not critical.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrol and polyacetylene), and the like, and a binder such as poly(tetrafluoroethylene) to form under pressure a positive cathodic plate.

In another preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of solvent comprising a 10:1 to 1:10 mixture of an organic carbonate and a triglyme of Formula I above; and from at least about 5 weight percent to about 30 weight percent of a solid matrix forming monomer or partial polymer thereof. (All weight percents are based on the total weight of the cathode.)

The cathode paste is typically spread onto a suitable support such as a current collector and then cured by conventional methods to provide for a solid positive cathodic plate. The cathode (excluding the support) generally has a thickness of about 20 to about 150 microns.

Current collectors are well known in the art some of which are commercially available. A particularly preferred current collector for the cathode is a roughened nickel (electrolytically deposited nickel) on nickel current collector (available as CF18/NiT from Fukuda Metal Foil & Powder Company, Ltd., Kyoto, Japan). The current collectors are preferably attached to the surface of the cathode not facing the electrolyte but can also be attached to the anode. When the current collector is attached to the cathode, the cathode is interposed between the electrolyte and the current collector.

In still another preferred embodiment, the electrolyte solvent and the cathode solvent are identical.

Methodology

Methods for preparing solid, solvent-containing electrolytes are well known in the art. This invention, however, utilizes a particular solvent (plasticizer) mixture in the preparation of solid electrolytes which solvent mixture provides unexpected enhancements in the capacity of solid electrolytic cells utilizing these solid electrolytes. The solvent mixture employed herein comprises about a 10:1 to 1:10 mixture of an organic carbonate and a triglyme of Formula I above. Preferably, the ratio of organic carbonate and triglyme of Formula I is from about 6:1 to 1:6, more preferably from about 4:1 to 1:4, even more preferably from about 3:1 to about 1:3; yet even more preferably from about 2:1 to about 1:2; and still even more preferably about 1:1.

As noted above, organic carbonates are either commercially available or can be prepared by art recognized methods.

Similarly, triglymes of Formula I above are also either commercially available or can be prepared by art recognized methods. For example, the preparation of $RO(CR_3R_4CR_5R_6O)_3OH$ compounds, where R, $R_3$, $R_4$, $R_5$ and $R_6$ are as defined above, can be readily prepared by reaction of an ethylene oxide derivative [an oxide derived from $CR_3R_4$=$CR_5R_6$ by conventional methods] with ROH under polymerization conditions. See, for example, U.S. Pat. No. 4,695,291 which is incorporated herein by reference. Careful control of the stoichiometry (3 moles of the ethylene oxide derivative to 1 mole of ROH) and reaction conditions will result in formation of a mixture of compounds of the formula $RO(CR_3R_4CR_5R_6O)_sOH$ wherein the mixture will contain a substantial amount of the compound where s=3 as well as other polymers (i.e., s=2, s=4, etc.). The polymer where s=3 can then be separated from the reaction mixture by conventional methods including distillation, column chromatography, high performance liquid chromatography (HPLC), and the like. Alkylation of this compound to provide for compounds of Formula I can be readily accomplished by known methods including, by way of example, treatment with metallic sodium followed by addition of $R_2Cl$.

The solid, solvent-containing electrolyte is then preferably prepared by combining a solid matrix forming monomer with lithium bis(trifluoromethane sulfonyl)imide and the solvent mixture of an organic carbonate and the triglyme of Formula I. The resulting composition is then uniformly coated onto a suitable substrate (e.g., aluminum foil, a glass plate, a lithium anode, a cathode, etc.) by means of a roller, a doctor blade, a bar coater, a silk screen or spinner to obtain a film of this composition or its solution. In some cases, it may be necessary to heat the composition so as to provide for a coatable material.

Preferably, the amount of material coated onto the substrate is an amount sufficient so that after curing, the resulting solid, solvent-containing electrolyte has a thickness of no more than about 250 microns (μm). Preferably, the solid, solvent-containing electrolyte has a thickness of from about 25 to about 250 microns, more preferably from about 50 to about 150 microns, and even more preferably from about 80–100 microns.

The electrolyte composition typically comprises from about 5 to about 25 weight percent of lithium bis(trifluoromethane sulfonyl)imide based on the total weight of the electrolyte; preferably, from about 10 to 20 weight percent; and even more preferably about 15 weight percent.

The electrolyte composition typically comprises from about 40 to about 80 weight percent solvent (i.e., organic carbonate/triglyme mixture) based on the total weight of the electrolyte; preferably from about 60 to about 80 weight percent; and even more preferably about 70 weight percent.

The solid electrolyte composition typically comprises from about 5 to about 30 weight percent of the solid polymeric matrix based on the total weight of the electrolyte; preferably from about 10 to about 20 weight percent; and even more preferably about 17 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

The composition is cured by conventional methods to form a solid film. For example, when the solid matrix forming monomer contains a reactive double bond, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like). When curing is by UV radiation, the initiator is typically benzophenone, Darocur 1173 (Ciby Geigy, Ardlesy, N.Y.), and the like.

The initiator is generally employed in an amount sufficient to catalyze the polymerization reaction. Preferably, the initiator is employed at up to about 1 weight percent based on the weight of the solid matrix forming monomer.

When curing is by EB treatment, an initiator is not required.

In an alternative embodiment, the solid polymeric matrix (e.g., formed by polymerization of a solid matrix forming monomer) can be dissolved into a suitable volatile solvent and the requisite amounts of the lithium salt and solvent mixture of an organic carbonate and a triglyme of Formula I are then added. The mixture is then applied onto a suitable substrate (e.g., the surface of the cathode opposite to the current collector) in the manner set forth above and the volatile solvent removed by conventional techniques to provide for a solid electrolyte. Suitable volatile solvents preferably have a boiling point of less than 85° C. and more preferably between about 45° and 85° C. Particularly preferred volatile solvents are aprotic solvents. Examples of suitable volatile solvents include acetonitrile, tetrahydrofuran, and the like. However, acetonitrile is not preferred if it is to contact the anode.

In either case, the resulting solid electrolyte is a homogeneous, single phase material which is maintained upon curing, and does not readily separate upon cooling to temperatures below room temperature. See, for example, U.S. Pat. No. 4,925,751 which is incorporated herein by reference in its entirety.

Additionally, it is desirable to avoid the use of any protic materials which will be incorporated into the battery. For example, most of the protic inhibitors in di- and triacrylate monomers as well as in the urethane acrylate prepolymers are preferably removed prior to formation of the cathode and/or electrolyte. In this regard, removal of these inhibitors down to a level of less than 50 parts per million (ppm) can be accomplished by contacting these monomers and prepolymers with an inhibitor remover. Suitable inhibitor removers are commercially available.

In a preferred embodiment, the process of forming an electrolytic cell comprises the steps of coating the surface of a cathode with a composition comprising a solid matrix forming monomer, lithium bis(trifluoromethane sulfonyl)imide and the solvent mixture of an organic carbonate and a triglyme compound of Formula I. The composition is then cured to provide for a solid electrolyte on the cathodic surface. The anode (e.g., a lithium foil) is then laminated to this composite product in such a way that the solid electrolyte is interposed between the lithium foil and the cathodic material.

This process can be reversed so that the surface of a anode is coated with a composition comprising a solid matrix forming monomer, lithium bis(trifluoromethane sulfonyl)imide and the solvent mixture of an organic carbonate and a triglyme compound of Formula I. The composition is then cured to provide for a solid electrolyte on the anodic surface. The cathode is then laminated to this composite product in such a way that the solid electrolyte is interposed between the lithium foil and the cathodic material.

Methods for preparing solid electrolytes and electrolytic cells are also set forth in U.S. Pat. Nos. 4,830,939 and 4,925,751 which are incorporated herein by reference in their entirety.

Utility

The solid, solvent-containing electrolytes described herein are particularly useful in preparing solid electrolytic cells having improved ionic conductivity, thermal stability and cumulative capacity compared to solid, solvent-containing electrolytes containing other salts and either only an organic carbonate or a triglyme of Formula I as the solvent. Additionally, it is contemplated that, the solid, solvent-containing electrolytes of this invention enhances the cycle life of the battery.

Formulation of solid electrolytes were made substantially as described in the examples. The composition of two solid electrolytes is shown in Table I.

TABLE I

|  | Weight % | Weight % |
| --- | --- | --- |
| Propylene Carbonate | 56.60 | 54.16 |
| Triglyme | 14.13 | 13.54 |
| Urethane Acrylate | 17.56 | 16.83 |
| $LiPF_6$ | 9.24 | 0 |
| $LiN(SO_2CF_3)_2$ | 0 | 13.01 |
| Poly(propylene oxide) MW 600,00 | 2.57 | 2.46 |
|  | 100.00% | 100.00% |

Analogous formulations of electrolytes were made using $LiAsF_6$ and $LiSO_3CF_3$ as the inorganic ion salts is a 4:1 solvent mixture of propylene carbonate to triglyme. The conductivities of these electrolytes over a broad temperature range is shown in FIG. 1. The imide salt-containing electrolyte of the present invention has superior conductivity to the well-known electrolyte inorganic ion salt $LiSO_3CF_3$. The imide salt-containing electrolyte of the present invention is safer to use and dispose of than the arsenic salt, and furthermore, the imide is found to be much more thermally stable than the well-known and often used $LiPF_6$ salt.

High temperature processing, storage or performance conditions are often required of solid electrolytes. In such use $LiPF_6$ is found to be less thermally stable then the imide salt of the present invention.

FIG. 2 shows the discharge capacity and recharge ratio of cells constructed from the electrolyte of the present invention substantially as shown in the examples. The long cycle life of the cell, more than 200 cycles, even at 60° C. over a 14 day period, is illustrative of the improved cumulative capacity of solid electrolytes of the present invention.

FIG. 2 also illustrates the constant recharge ratio of unity over the test period, confirming the improved performance of cells manufactured from solid electrolytes of this invention.

The following hypothetical examples are offered to illustrate the present invention and should not be construed in any way as limiting its scope.

A solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

84.4 weight percent of carbon powder (Shawinigan Black™—available from Chevron Chemical Company, San Ramon, Calif.)

337.6 weight percent of a 25 weight percent solution of polyacrylic acid (a reported average molecular weight of about 90,000, commercially available from Aldrich Chemical Company—contains about 84.4 grams polyacrylic acid and 253.2 grams water)

578.0 weight percent of isopropanol

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0.002 inches thick by about 2 inches and by about 9 inches wide—the entire width of aluminum foil). The wipe is flexibly engaged with the foil (i.e., the wipe merely contacted the foil) to redistribute the solution so as to pro-vide for a substantially uniform coating. Evaporation of the solvents (i.e., water and isopropanol) via a conventional gas-fired oven provides for an electrically-conducting adhesion-promoter layer of about 6 microns in thickness or about $3\times10^{-4}$ grams per cm$^2$. The aluminum foil is then cut to about 8 inches wide by removing approximately ½ inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs of carbon powder (Shawinigan Black™—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lightin Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 μm with the occasional 12.5 μm particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 μm cloth filter (e.g., So-Clean Filter Systems, American Felt and Filter Company, Newburgh, N.Y.) and Meyer-rod coated as described above.

B. The Cathode

The cathode is prepared from a cathodic paste which, in turn, is prepared from a cathode powder as follows:

i. Cathode Powder

The cathode powder is prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black™). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $V_6O_{13}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, Pa.), and about 7.6 grams of ethoxylated trimethylolpropane triacylate (TMPEOTA) (molecular weight about 450 available as SR-454 from Sartomer Company, Inc., Exton, Pa.) in a double planetary mixer (Ross #2 mixer available from Charles Ross & Sons, Company, Hauppag, N.Y.).

A propeller mixture is inserted into the double planetary mixer and the resulting mixture is stirred at a 150 rpms until homogeneous. The resulting solution is then passed through sodiated 4A molecular sieves. The solution is then returned to double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex from by the propeller by a minisieve such as a 25 mesh mini-sieve commercially available as Order No. 57333-965 from VWR Scientific, San Francisco, Calif.

The solution is then heated while stirring until the temperature of the solution reaches 65° C. At this point, stirring is continued until the solution is completely clear. The propeller blade is removed and the carbon powder prepared as above is then is added as well as an additional 28.71 grams of unground carbon (from Chevron Chemical Company, San Ramon, Calif. under the tradename of Shawinigan Black™). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second the mixture slowly cooled to 40° C. to 48° C. (e.g. about 45° C.). The resulting cathode paste is maintained at this temperature until just prior to application onto the current collector.

The resulting cathode paste has the following approximate weight percent of components:

| | |
|---|---|
| $V_6O_{13}$ | 45 weight percent |
| Carbon | 10 weight percent |
| 4:1 propylene carbonate/triglyme | 34 weight percent |
| polyethylene oxide | 1 weight percent |
| polyethylene glycol diacrylate | 8.5 weight percent |
| ethoxylated trimethylolpropane triacrylate | 1.5 weight percent |

In an alternative embodiment, the requisite amounts of all of the solid components are added to directly to combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992 as Attorney Docket No. 1116 and entitled "METHODS FOR ENHANCING THE COATABILITY OF CARBON PASTES TO SUBSTRATES", which application is incorporated herein by reference in its entirety.

The so-prepared cathode paste is then placed onto the adhesion layer of the current collector described above by extrusion at a temperature of from about 45° to about 48° C. A Mylar cover sheet is then placed over the paste and the paste is spread to thickness of about 90 microns (μm) with a conventional plate and roller system and is cured by continuously passing the sheet through an electron beam apparatus (Electro-curtain, Energy Science Inc., Woburn, Mass.) at a voltage of about 175 kV and a current of about 1.0 mA and at a rate of about 1 cm/sec. After curing, the Mylar sheet is removed to provide for a solid cathode laminated to the aluminum current collector described above.

C. Electrolyte 56.51 grams of propylene carbonate, 14.13 grams of triglyme, and 17.56 grams of urethane acrylate (Photomer 6140, available from Henkel Corp., Coating and Chemical Division, Ambler, Pa.) are combined at room temperature until homogeneous. The resulting solution is passed through a column of 4A sodiated molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° and 48° C., a thermocouple is placed at the edge of the vortex created by the magnetic stirrer to monitor solution temperature, and then 13.57 grams of $LiN(SO_2CF_3)_2$ is added to the solution over a 120 minute period while thoroughly mixing to ensure a substantially uniform temperature profile throughout the solution. Cooling is applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[a] |
|---|---|---|
| Propylene Carbonate | 56.51g | 54.16 |
| Triglyme | 14.13g | 13.54 |
| Urethane Acrylate | 17.56g | 16.83 |
| LiN $(So_2CF_3)_2$ | 13.57g | 13.01 |
| PEO Film Forming Agent | 2.57g | 2.46 |
| Total | 104.34g | 100% |

[a] = weight percent based on the total weight of the electrolyte solution (100 g)

This solution is then degassed to provide for an electrolyte solution wherein little, if any, of the $LiN(SO_2CF_3)_2$ salt decomposes.

Optionally, solutions produced as above and which contains the prepolymer, the polyalkylene oxide film forming agent, the electrolyte solvent and the $LiN(SO_2CF_3)_2$ salt are filtered to remove any solid particles or gels remaining in the solution. One suitable filter device is a sintered stainless steel screen having a pore size between 1 and 50 μm at 100% efficiency.

The mixing procedure employs the following steps:

1. Check the moisture level of the urethane acrylate. If the moisture level is less than 100 ppm water, proceed to step 2.

If not, then first dissolve the urethane acrylate at room temperature, <30° C., in the propylene carbonate and triglyme and dry the solution over sodiated 4A molecular sieves (Grade 514, 8-12 Mesh from Schoofs Inc., Moraga, Calif.) and then proceed to step 4.

2. Dry the propylene carbonate and triglyme over sodiated 4A molecular sieves (Grade 514, 8-12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent to light yellow in color. Optionally, in this step, the mixture is heated to 65° C. to 68° C.

7. Cool the solution produced in step 6 and when the temperature of the solution reaches 40° C., add the $LiN(SO_2CF_3)_2$ salt very slowly making sure that the maximum temperature does not exceed 55° C.

8. After the final addition of the $LiN(SO_2CF_3)_2$ salt, stir for an additional 30 minutes, degas, and let sit overnight and cool.

9. Filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 μm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode.

D. Anode

The anode comprises a sheet of lithium foil (about 76 μm thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte in the sheet produced in step C above. Lamination is accomplished by minimal pressure.

While the invention has been described in terms of various preferred embodiments, the skilled artisan will appreciate that various modifications, substitutions, omissions and changes may be made without departing from the spirit thereof. Accordingly, it is intended that the scope of the present invention be limited solely by the following claims.

What is claimed is:

1. A solid, single-phase, solvent-containing electrolyte which comprises:

a solid polymeric matrix;

lithium bis(trifluoromethane sulfonyl)imide; and a solvent comprising about a 10:1 to 1:10 mixture of an organic carbonate and a triglyme represented by Formula I:

$$RO(R_1O)_3R_2 \qquad \text{I}$$

where R and $R_2$ are independently selected from the group consisting of alkyl of from 1 to 6 carbon atoms, phenyl, alkphenyl of from 7 to 12 carbon atoms, and phenyl substituted with 1 to 3 substituents selected from the group consisting of alkyl of from 1 to 4 carbon atoms, alkoxy of from 1 to 4 carbon atoms, chloro and bromo; and $R_1$ is  where $R_3$, $R_4$, $R_5$ and $R_6$ are independently selected from the group consisting of hydrogen and alkyl of from 1 to 4 carbon atoms wherein the solid electrolyte does not include a separator.

2. The solid, single-phase, solvent-containing electrolyte of claim 1 wherein the R and $R_2$ are —$CH_3$ and $R_1$ is —($CH_2CH_2$)—.

3. The solid, single-phase, solvent-containing electrolyte of claim 2 wherein the organic carbonate is selected from the group consisting of an alicyclic carbonate and an aliphatic carbonate.

4. The solid, single-phase, solvent-containing electrolyte of claim 3 wherein the alicyclic carbonate is represented by the formula:

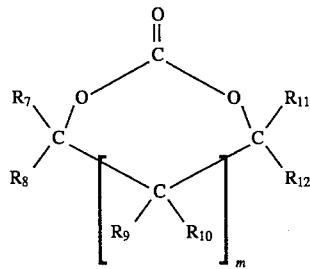

where $R_7$, $R_8$, $R_9$, $R_{10}$, $R_{11}$, and $R_{12}$ are independently selected from the group consisting of hydrogen and alkyl of from 1 to 2 carbon atoms, and m is an integer equal to 0 or 1.

5. The solid, single-phase, solvent-containing electrolyte of claim 4 wherein m is zero, $R_7$, $R_8$ and $R_{11}$ are hydrogen and $R_{12}$ is hydrogen or methyl.

6. The solid, single-phase, solvent-containing electrolyte of claim 5 wherein $R_{12}$ is hydrogen.

7. The solid, single-phase, solvent-containing electrolyte of claim 5 wherein $R_{12}$ is methyl.

8. The solid, single-phase, solvent-containing electrolyte of claim 3 wherein the aliphatic carbonate is represented by the formulae:

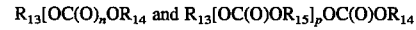

where each $R_{13}$ and $R_{14}$ are independently selected from the group consisting of alkyl of from 1 to 4 carbon atoms; $R_{15}$ is an alkylene group of from 2 to 4 carbon atoms; n is an integer of from 1 to 2, and p is an integer from 1 to 4 wherein the solid electrolyte does not include a separator.

9. The solid, single-phase, solvent-containing electrolyte of claim 1 wherein the ratio of organic carbonate to the triglyme of Formula I is from about 6:1 to 1:6.

10. The solid, single-phase, solvent-containing electrolyte of claim 9 wherein the ratio of organic carbonate to the triglyme of Formula I is about 1:4 to about 4:1.

11. The solid, single-phase solvent-containing electrolyte of claim 9 wherein the ratio of organic carbonate to the triglyme of Formula I is about 1:1.

12. An electrolytic cell which comprises:
   an anode containing a compatible anodic material;
   a cathode containing a compatible cathodic material; and
   interposed therebetween a solid, single-phase, solvent-containing electrolyte which comprises:
      a solid polymeric matrix;
      lithium bis(trifluoromethane sulfonyl)imide; and
      a solvent comprising about a 10:1 to 1:10 mixture of an organic carbonate and a triglyme represented by Formula I:

$$RO(R_1O)_3R_2 \quad\quad\quad I$$

where R and $R_2$ are independently selected from the group consisting of alkyl of from 1 to 6 carbon atoms, phenyl, alkphenyl of from 7 to 12 carbon atoms, and phenyl substituted with 1 to 3 substituents selected from the group consisting of alkyl of from 1 to 4 carbon atoms, alkoxy of from 1 to 4 carbon atoms, chloro and bromo; and $R_1$ is —$(CR_3R_4CR_5R_6)$— where $R_3$, $R_4$, $R_5$ and $R_6$ are independently selected from the group consisting of hydrogen and alkyl of from 1 to 4 carbon atoms wherein the solid electrolyte does not include a separator.

13. The electrolytic cell of claim 12 wherein the R and $R_2$ are —$CH_3$ and $R_1$ is —$(CH_2CH_2)$—.

14. The electrolytic cell of claim 12 wherein the organic carbonate is selected from the group consisting of an alicyclic carbonate and an aliphatic carbonate.

15. The electrolytic cell of claim 14 wherein the alicyclic carbonate is represented by the formula:

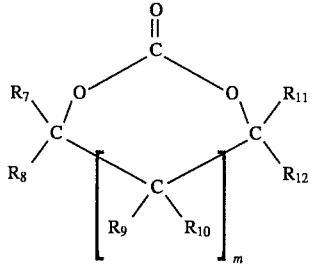

where $R_7$, $R_8$, $R_9$, $R_{10}$, $R_{11}$, and $R_{12}$ are independently selected from the group consisting of hydrogen and alkyl of from 1 to 2 carbon atoms, and m is an integer equal to 0 or 1.

16. The electrolytic cell of claim 15 wherein m is zero, $R_7$, $R_8$ and $R_{11}$ are hydrogen and $R_{12}$ is hydrogen or methyl.

17. The electrolytic cell of claim 16 wherein $R_{12}$ is hydrogen.

18. The electrolytic cell of claim 16 wherein $R_{12}$ is methyl.

19. The electrolytic cell of claim 14 wherein the aliphatic carbonate is represented by the formulae:

$$R_{13}[OC(O)]_nOR_{14} \text{ and } R_{13}[OC(O)OR_{15}]_pOC(O)OR_{14}$$

where each $R_{13}$ and $R_{14}$ are independently selected from the group consisting of alkyl of from 1 to 4 carbon atoms; $R_{15}$ is an alkylene group of from 2 to 4 carbon atoms; n is an integer of from 1 to 2, and p is an integer from 1 to 4.

20. The electrolytic cell of claim 12 wherein the ratio of organic carbonate to the triglyme of Formula I is from about 6:1 to 1:6.

21. The electrolytic cell of claim 20 wherein the ratio of organic carbonate to the triglyme of Formula I is about 1:4 to about 4:1.

22. The electrolytic cell of claim 21 wherein the ratio of organic carbonate to the triglyme of Formula I is about 1:1.

23. A method for enhancing the cumulative capacity of an electrolytic cell which comprising an anode containing a compatible anodic material, a cathode containing a compatible cathodic material; and interposed therebetween a solid, solvent-containing electrolyte which method comprises:

(a) selecting a solid, single-phase, solvent-containing electrolyte which comprises:
      a solid polymeric matrix;
      lithium bis(trifluoromethane sulfonyl)imide; and
      a solvent comprising about a 10:1 to 1:10 mixture of an organic carbonate and a triglyme represented by Formula I:

$$RO(R_1O)_3R_2 \quad\quad\quad I$$

where R and $R_2$ are independently selected from the group consisting of alkyl of from 1 to 6 carbon atoms, phenyl, alkphenyl of from 7 to 12 carbon atoms, and phenyl substituted with 1 to 3 substituents selected from the group consisting of alkyl of from 1 to 4 carbon atoms, alkoxy of from 1 to 4 carbon atoms, chloro and bromo; and $R_1$ is —$(CR_3R_4CR_5R_6)$— where $R_3$, $R_4$, $R_5$ and $R_6$ are independently selected from the group consisting of hydrogen and alkyl of from 1 to 4 carbon atoms wherein the solid electrolyte does not include a separator.

* * * * *